United States Patent [19]

Rizzotto et al.

[11] Patent Number: 5,799,132
[45] Date of Patent: Aug. 25, 1998

[54] FUZZY LOGIC ELECTRONIC CONTROLLER AND ASSOCIATED METHOD FOR SETTING UP MEMORIES THEREOF

[75] Inventors: Gianguido Rizzotto, Civate; Rinaldo Poluzzi; Andrea Pagni, both of Milan, all of Italy

[73] Assignee: SGS-Thomson Microelectronics S.r.l., Agrate Brianza, Italy

[21] Appl. No.: 22,347

[22] Filed: Feb. 24, 1993

[30] Foreign Application Priority Data

Feb. 28, 1992 [EP] European Pat. Off. .......... 92830095

[51] Int. Cl.$^6$ .......................................... G06G 7/00
[52] U.S. Cl. .......................................... 395/3; 395/900
[58] Field of Search .................... 395/3, 10, 11, 395/900, 61, 51

[56] References Cited

U.S. PATENT DOCUMENTS

| | | | |
|---|---|---|---|
| 5,202,954 | 4/1993 | Miyazawa et al. | 395/3 |
| 5,206,566 | 4/1993 | Yoshida et al. | 395/900 |
| 5,261,036 | 11/1993 | Nakano | 395/61 |
| 5,299,283 | 3/1994 | Hamamoto | 395/3 |
| 5,305,424 | 4/1994 | Ma et al. | 395/51 |
| 5,343,553 | 8/1994 | Miyazawa et al. | 395/3 |
| 5,371,832 | 12/1994 | Eichfeld et al. | 395/3 |

FOREIGN PATENT DOCUMENTS

| | | |
|---|---|---|
| 89117778 | 9/1989 | European Pat. Off. . |
| 90106933 | 4/1990 | European Pat. Off. . |
| 90120340 | 10/1993 | European Pat. Off. . |

OTHER PUBLICATIONS

Proceedings of the Twentieth International Symposium in Multiple-Value Logic, May, 1990, Charlotte, US, pp. 394–400, Li Zhijian, Jiang Hong, "A CMOS Current-Mode High Speed Fuzzy Logic Microprocessor for a Real Time Expert System".

Microprocessing and Microprogramming, vol. 24, No. 1-5, Aug., 1988, Amsterdam, NL, pp. 647–654, E.L. Zapata, et al, "A VSLI Systolic Architecture for Fuzzy Clustering".

Huang et al, "Efficient computer implementation of a rule-based three-term controller"; Proceedings of the 27th IEEE Conference on Decision and Control, pp. 2247–2248, Dec. 7–9, 1988.

Yamguchi et al, "Fuzzy adaptive control with an associative memory system"; International Conference on Control '91, pp. 944–949, Mar. 25–28 1991.

*Primary Examiner*—Tariq R. Nafiz
*Attorney, Agent, or Firm*—Wolf, Greenfield & Sacks, P.C.

[57] ABSTRACT

A fuzzy logic electronic controller whereby predetermined membership functions μ(x) of logic (X) variables are subjected to so-called inference operations configured essentially as IF-THEN rules with at least one front preposition and at least one rear implication. The controller is of a kind which includes an input or fuzzyfier section having a plurality of inputs for analog or digital signals, a central control unit or fuzzy controller core placed after said input section and being provided with memories, and an output section or defuzzyfier connected to the output of the central unit to convert the results of the inference operations back to analog or digital signals. The controller includes a plurality of fuzzyfiers being disposed in parallel within said input section and each connected to a pair of analog and digital inputs, a plurality of storage modules corresponding in number to said fuzzyfiers and containing data of the front prepositions only of said rules, a fuzzy controller inference unit active in the central control unit to carry out logic operations based on said inference rules of the fuzzy logic by extracting data from said memories through an interfacing circuit, and an additional memory coupled between the fuzzy controller inference unit and the defuzzyfier and adapted to contain data pertaining to the rear (THEN) implications only of said inference rules.

6 Claims, 9 Drawing Sheets

FUZZY LOGIC ELECTRONIC CONTROLLER AND ASSOCIATED METHOD FOR SETTING UP MEMORIES THEREOF

BACKGROUND OF THE INVENTION

1. Field of the Invention

This invention relates to a fuzzy logic electronic controller and associated method for setting up memories thereof.

More particularly, the invention relates to a fuzzy logic electronic controller whereby predetermined membership functions $\mu(x)$ of logic (X) variables are subjected to so-called "inference operations" configured essentially as IF-THEN rules with at least one front preposition and at least one rear implication. The electronic controller comprises an input or fuzzyfier section having a plurality of inputs for analog or digital signals, a central control unit or fuzzy controller core placed after said input section and being provided with memories, and an output section or defuzzyfier connected to an output of the central control unit to convert the results of the inference operations back to analog or digital signals.

The field of application of this invention pertains to the development of artificial intelligence and in particular to electronic data processing means based on a logic of the so-called fuzzy type.

2. Discussion of the Related Art

Fuzzy logic is winning acceptance as a technique that can provide solutions to a wide range of control problems wherein conventional techniques, such as those based on boolean logic, have proved unable to achieve acceptable levels of performance at a moderate cost.

Until now, however, fuzzy logic applications have suffered limitations due to the lack of dedicated computation devices. These limitations result from the fact that conventional electronic means, based on totally different information handling techniques and concepts, hardly suit effective operation in the fuzzy computation mode.

For a better understanding of the invention, the two main methods of representing and modelling reality, i.e. the mathematical model types that can be used to define the terms of a given problem to be solved, are reviewed next. Specifically, these are the methods which are commonly employed to find a solution to problems through electronic computation means.

A first method provides a numerical/analytical description of reality, and is widely used for scientific and engineering applications wherever all the terms of a problem to be solved can be effectively located. This method has greatly influenced the architecture of current data processing means, but hardly suits cases where the aspects of a problem are hazy, i.e. difficult to locate, as in, for example, applications relating to artificial intelligence.

In such circumstances a modelling technique that can provide a quantitative/qualitative description of the problem awaiting solution, has been shown to be more effective. Fuzzy logic provides a body of rules for handling those sets of problems which present themselves in uncertain and imprecise frames as are typical of most human activities.

In other words, fuzzy logic provides a method of modelling the "vague" mental processes typical of human reasoning, which processes play, however, a vital role in the very capability of humans to make decisions under conditions of uncertainty.

More specifically, fuzzy logic operates on a linguistic description of reality using a particular class of variables, referred to as language variables. The values of such variables may include, for example, words or statements for use in modelling a given problem.

Further, each variable may be associated syntactically with a set of values that are dependent on the variable and capable of taking on different meanings to suit the context in which they are used. Such values are obtained from a primary term which represents the variable, an antonym thereof, and a series of so-called primary term modifiers.

Let us assume, by way of example, that the "temperature" name or notion be defined as a language X variable; also, let us select, for the primary term of the X variable, the word "cold" and define "hot" as its antonym. With the primary term may also be associated a series of so-called modifiers, such as "not", "very", "less", etc. (i.e., "not cold", "very cold", "less cold", etc.) which complete the set of values of the variable, even if in a non-univocal or uncertain way, but adequate for the purposes of fuzzy logic.

Moreover, each value assigned to a language variable is represented by a so-called "fuzzy set", that is a stochastic distribution function which ties each value of the variable to a point in the universe of discourse in the [0,1] range. Those functions which identify a fuzzy set in the universe of discourse of a variable are referred to as membership functions $\mu(x)$. For example, a value of $\mu(x)=0$ would be indicative that the point x is not a member of the fuzzy set identified by the $\mu$ function. By contrast, a value of $\mu(x)=1$ would indicate that x is definitely a member of the fuzzy set.

The aggregate of all the fuzzy sets of a language variable is called a term set. In addition, appropriate operations to define the rules for fuzzy computation are carried out on the membership functions.

Two different types of representations are possible with the membership functions: analytical or vectorial. The former is a function of the universe of discourse and enables so-called "mapping" of that universe within a 0–1 range of values.

The latter is a vectorial sample representation of the membership function which is obtained by splitting the universe of discourse into N segments, and the [0,1] range into L levels.

Between the membership functions, logic operations, known as inference operations, may be performed as explained hereinafter. Meanwhile, it is important to observe that the electronic data processing means used to carry out such operations is preferably a specific architecture dedicated to the body of inference operations that make up the computational model in the fuzzy logic.

A dedicated fuzzy computation means may currently be implemented by two different technologies: a so-called hybrid or analog/digital one, and an expressly digital one.

The choice of either technology strongly affects the representation types by which the membership functions can be formalized. Therefore, with a hybrid technology, membership functions can only be represented in a vectorial way, and the vector components are voltage and/or current values representing so-called levels of truth.

The vertical space is then segmented into an L number of levels according to requirements, while the universe of discourse is determined at the designing stage.

This technology has been developed by the FLSI (Fuzzy Logic System Institute) headed by Professor Yamakawa, and is described, for instance, in a publication entitled "Intrinsic Fuzzy Electronic Circuits for Sixth Generation Computer", published by M. M. Gupta & T. Yamakawa in 1988.

By contrast, the digital technology allows representation of the membership functions both in vectorial and analytical forms.

In the instance of analytical representation, there are two formalization methods one of which includes of providing just some notable points of a function, specifically those where the function changes its gradient. The fuzzy device is delegated to join such points in order for it to proceed properly through the fuzzy computation.

An example of that device is provided by a machine from OMRON Corporation designated FP-3000 for which an operation manual entitled "Digital Fuzzy Processor-Controller Series" is available.

Among the benefits of this approach is the high precision with which the universe of discourse of the various functions can be segmented both in the horizontal plane and the vertical.

But there are some disadvantages as well, originating from the low flexibility afforded in describing the membership functions. For example, in the above case, there can be just four inflection points at most, which must necessarily carry truth values of 0 or 1.

The second-mentioned method of formalizing the analytical approach includes of providing the equations that describe the membership function in its domain. In this case, higher flexibility is achieved in defining such functions.

However, with either of these analytical methods, the fuzzy computation is carried out by a purely numerical approach, which has very unfavorable effects at the computation level.

Considering now the digital technology which uses the vectorial representation of the membership functions, it is primarily distinguished by the fact that the vertical axis representation of a given level of truth involves, by necessity, the use of a number of bits dependent on the target degree of accuracy.

The advantages of this technology most definitely include extreme computational simplicity in carrying out the computation operations, i.e. the fuzzy inference computations.

An example of such an embodiment is described in an article "A VLSI Fuzzy Logic Controller with Reconfigurable, Cascadable Architecture" by H. Watanabe on IEEE Journal of Solid-State Circuits, Vol. 25, No. 2, April 1990.

The present invention relates to a novel controller architecture within the framework of the digital technology.

An object of the present invention is to provide a controller architecture that has such structural and performance features so as to enable fuzzy logic computation problems to be addressed in a significantly shorter time and with fewer computing operations, thereby to overcome the drawbacks of prior art solutions.

SUMMARY OF THE INVENTION

The present invention overcomes the problems of the prior art by providing a particular setup for the memory associated with the controller, so that data acquisition and storage can make the computing procedures for the inference operations simpler.

The fuzzy logic electronic controller of the invention wherein predetermined membership functions of logic variables are subjected to inference operations configured essentially as IF-THEN rules having at least one front preposition and at least one rear implication comprises an input section including a plurality of fuzzyfiers arranged in parallel, each fuzzyfier having at least one analog input and at least one digital input for converting input signals into fuzzy logic signals. The controller also includes a contral control unit including a plurality of storage modules having data of the front prepositions of the IF-THEN rules stored therein, each storage module corresponding to a fuzzyfier in the input section and each storage module having an input coupled to a respective corresponding fuzzyfier output, a fuzzy controller inference unit for carrying out logic operations based on the IF-THEN rules using data from the storage modules to the fuzzy controller inference unit, and an additional storage module coupled to the output of the fuzzy controller inference unit having data of the rear implications of the IF-THEN rules stored therein. The controller also includes a defuzzyfier section, coupled to an output of the additional storage module of the contral control unit, for converting a result of an inference operation back to an analog or digital signal.

The features and advantages of a controller according to this invention will become apparent from the following detailed description of an embodiment thereof, given by way of illustration and not of limitation with reference to the accompanying drawings.

DETAILED DESCRIPTION

Figure 1:
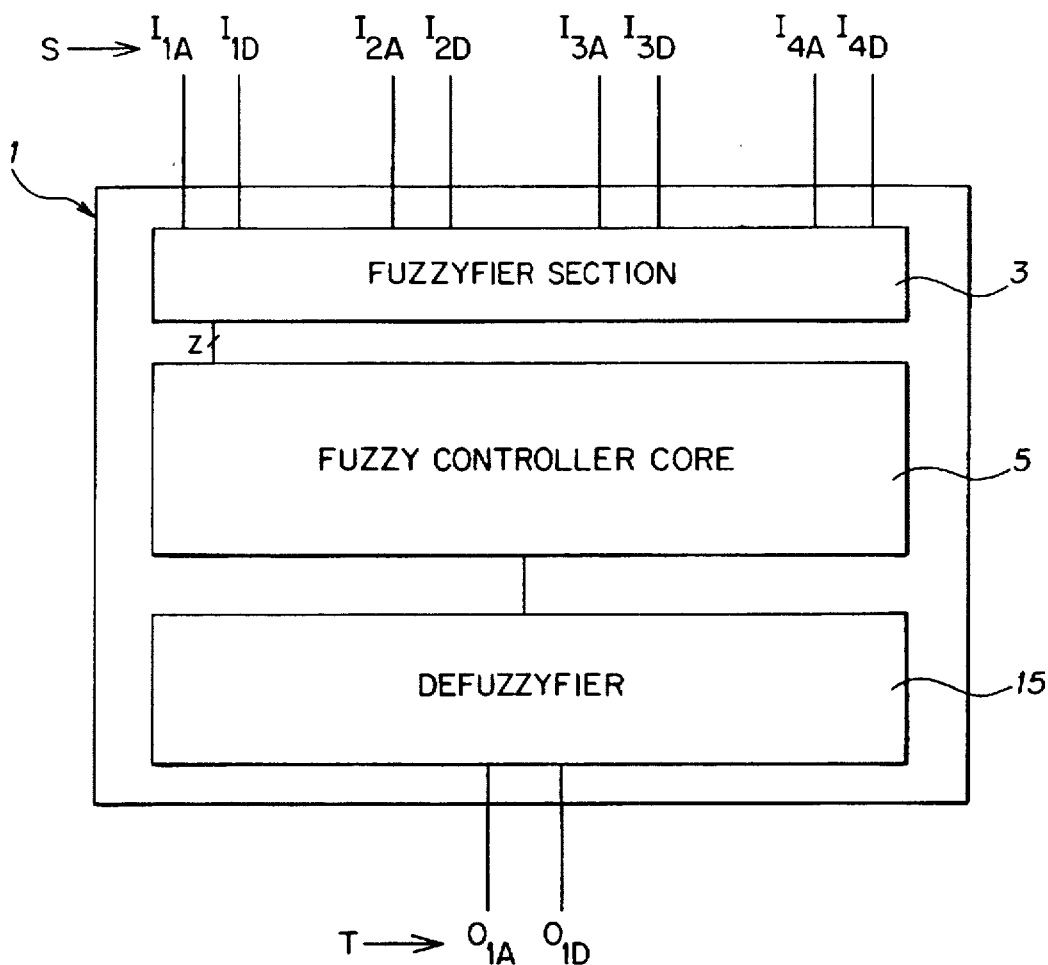
FIG. 1 is a general view showing schematically a controller embodying this invention.

With reference to the drawings, generally and schematically shown at 1 in FIG. 1 is an electronic controller embodying the present invention.

The controller 1 is intended for looped operation as a stand-alone machine, and is designed to operate in the fuzzy logic mode. More specifically, the fuzzy controller is a machine receiving input signals related to physical control variables, such as analog or digital signals from sensors, and performing predetermined, fuzzy logic inference operations, to provide output control signals.

For that purpose and others, the controller 1 is provided with a plurality S of analog inputs I1A, . . . , ISA and a like number of digital inputs I1D, . . . , ISD, respectively coupled to the controller. Such inputs are adapted to receive signals related to physical control variables, such as analog or digital signals from external sensors.

Figure 2:
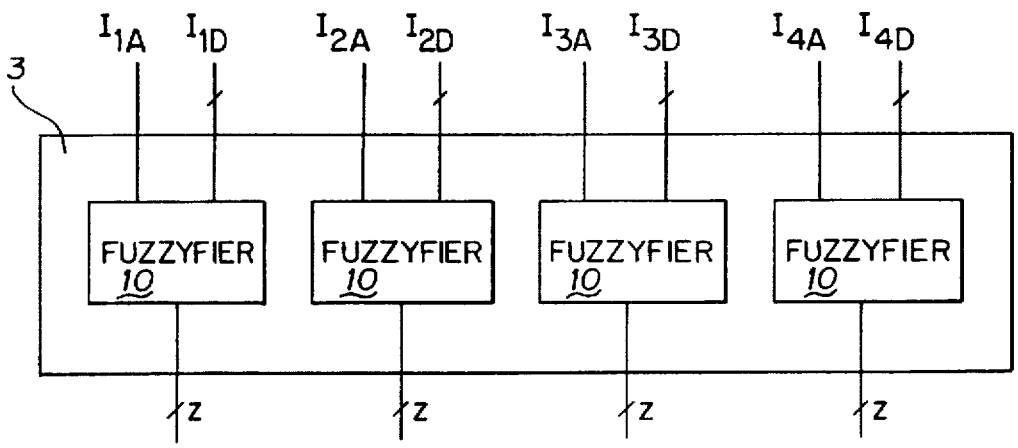
FIG. 2 is a schematic detail view of the fuzzyfier section of the controller shown in FIG. 1.
Figure 3:
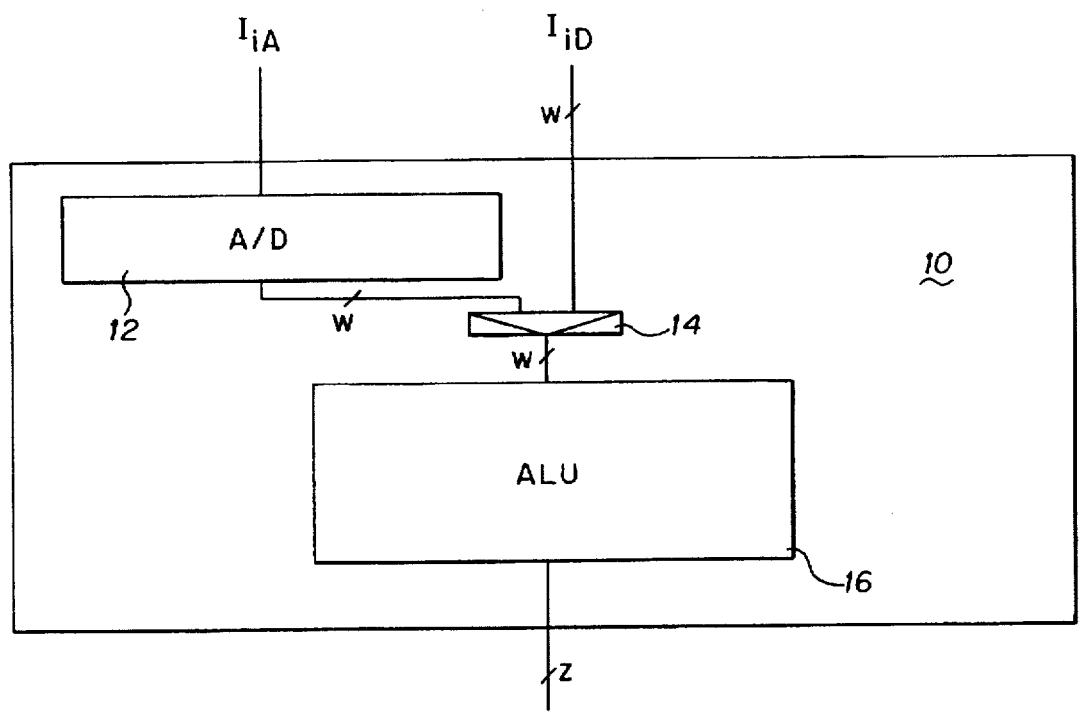
FIG. 3 is a more detailed view of the fuzzyfier section shown in FIG. 2.

Each generic and i-th input pair, IiA and IiD, are coupled to a corresponding converter device or fuzzyfier 10, shown in FIGS. 2 and 3, which converts an input signal to fuzzy type logic information, that is, to a so-called membership function $\mu(x)$. A cluster of n devices 10 in parallel with one another form an input and conversion section 3 of the controller 1 as shown in FIG. 2.

In a preferred embodiment, fuzzyfier section 3 comprises four fuzzyfiers 10 which allow four control signals, whether analog or digital in nature, to be input at one time. However, section 3 could accommodate a greater number of the fuzzyfiers 10, depending upon the interfacing requirements of any outside circuitry supplying the control signals.

The controller 1 further comprises a central unit or fuzzy controller core 5, wherein the fuzzy logic membership functions $\mu(x)$ are stored and the fuzzy logic computation is performed.

The architecture of controller 1 is completed by an output drive section or defuzzyfier 15, which provides an appropriate interface between the controller 1 and an outside circuitry to drive, for example, an actuator by converting fuzzy information to an analog or digital electric signal.

A number T of control outputs O1D,O1A, . . . OTD,OTA are provided in this respect for both digital and analog signals. A value of 1 is preferred for T.

It should be noted at this point that, when analyzed at a high level, the fuzzy logic is configured as a body of IF-THEN rules applied to the membership functions $\mu(x)$ of a logic variable X, such as IF (A is A1) and (B is B1)

THEN (C is C1) and (D is D1)

where A and B are the input values, A1, B1, C1 and D1 are membership functions $\mu(x)$ representing the system knowledge, and C and D are the output values.

That part of the rules that comes before THEN is referred to as an IF, front, or preposition part of the inference rule, and that which comes after THEN is referred to as a THEN, rear, or implication part of the inference rule.

Among the inference rules applicable to the membership functions of fuzzy variables, a so-called weight function $\alpha$ can be defined which is indicative of how well the input prepositions (A,B) of the IF part of a rule match the membership functions (A1,B1). In the instance of machines controlling physical quantities, such as those converting physical values from external sensors into fuzzy variables, the computation of weights a would be limited to finding the intercept of the input variable value on the membership functions of a given term set.

With reference to the above inference rule, it would be found, for example, that $\alpha 1^A = \max(\min(A,A1))$ and $\alpha 1^B = \max(\min(B,B1))$.

Another particularly indicative weight function is defined by $\Omega = \min(\alpha i^A, \alpha i^B, \ldots)$ and indicates the overall extent of likeness of the IF part of an inference rule.

In order to compress the number of the fuzzy rules, an "or" connector is often used in the IF part of such rules, e.g. to merge two rules into one. This is useful to reduce the number of memory accesses needed to carry out an inference operation.

To account for the presence of such connectors of the "or" type in the computational model being discussed, one should take a $Oi = \max(\Omega i1, \Omega i2, \Omega i3, \ldots)$ operator defined as the maximum of the $\Omega$ elements in an i-th rule composed of preposition groups associated with one another by "or" connectors but which do not contain the connectors as such.

The O operator is used to modify the membership functions related to the THEN part of the rules, and would be used on application of the MAX-MIN or MAX-DOT inferential methods, both known from pertinent literature and as employed herein in a manner to be explained. The former of these methods acts by cutting off the THEN-part membership functions, whereas the latter method modifies these functions so that their members are reduced, if compared to their original form.

The choice of such methods is dependent on the type of fuzzy set representation adopted.

Turning back to the architecture of controller 1, the inner structure of a generic i-th fuzzyfier 10 will be now described in greater detail. With reference to FIG. 3, it may be seen that the analog input IiA is connected to an analog to digital converter 12 adapted to transform an analog signal applied to it into a corresponding discrete value in the universe of discourse of the aggregate membership functions $\mu(x)$ of a given fuzzy variable X.

Since the architecture of controller 1 was defined with the aim of providing a discrete vectorial representation of the membership functions $\mu(x)$, an x1, . . . , xN, the universe of discourse of the variables selected is split into an N=64 number of segments, with each segment taking a value in the [1,2, . . . , L] range, and L=16 representing a degree of membership between two extremes of truth, 0=false and 1=true.

This non-restrictive choice of the values for N and L has been suggested by the need to accomodate conflicting requirements for accurate data representation and computational efficiency both in terms of the number of electronic components and the time taken to carry out an inference operation.

The use of a discrete variable representation domain with an $N=64=2^6$ number of segments has led to the use of a six-bit A/D converter 12 having its output connected to an input of a multiplexer 14 having two inputs and one output.

In the case where the input signal from the outside circuitry is already in the form of a digital signal, the digital input IiD of device 10 would be the same as the other input of multiplexer 14. The output of multiplexer it is connected directly to the input of a decoder block 16.

Therefore, irrespective of whether the signal being input to the device 10 is an analog or digital one, the decoder block 16 will receive a digital signal from multiplexer 14 over a six-bit bus w.

Block 16 computes the word address of a corresponding memory 7 where $\alpha$ values related to a term set under consideration are stored. The memory 7 is incorporated to the fuzzy controller core 5 described herein below.

The address of generic $\alpha$ value is computed by means of the following formula:Address of $\alpha$=|Base Value+(Input Value)*(Number of $\mu(x)$ Present in the Term Set)|/Size of Memory Words.

The block 16 incorporates circuitry for performing this computation at a high rate, such as an ALU (Arithmetic Logic Unit) or dedicated logic. The choice depends essentially on the desired performance level.

The output of block 16 consists of a series of z connections of the bus type that are connected to one of the memories 7 of unit 5.

Figure 4:
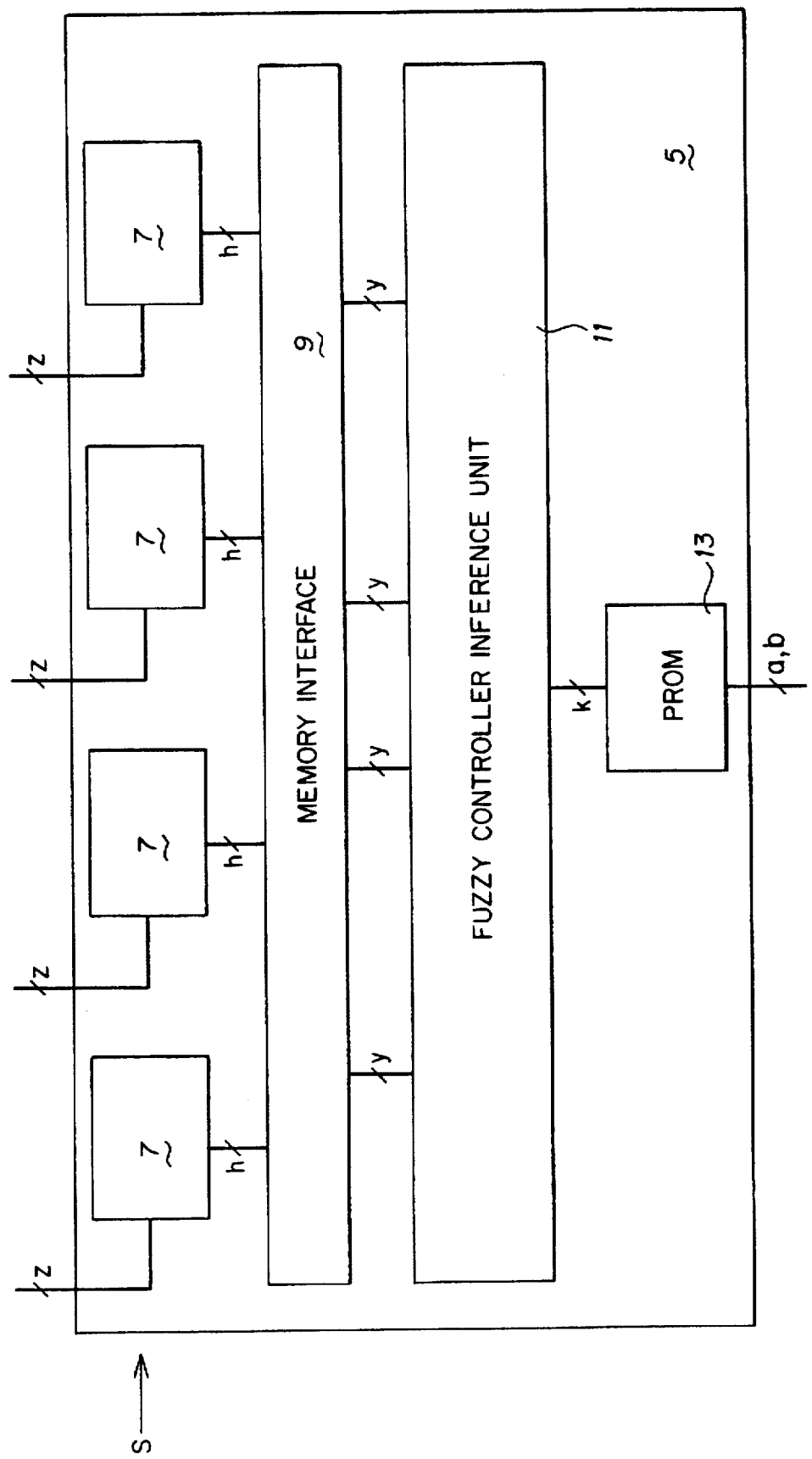
FIG. 4 is a schematic view of a central unit of the controller shown in FIG. 1.

A more detailed schematic of unit 5 is shown in FIG. 4 and includes a plurality S of programmable read-only memories 7 which may be of the PROM, EPROM or RAM type. Each memory corresponds to one of the aforesaid fuzzyfiers 10.

Each memory 7 is addressed by digital signals presented on the z bus leads interconnecting an equal number of inputs of each memory 7 with respective outputs of each corresponding fuzzyfier 10.

Figure 9:
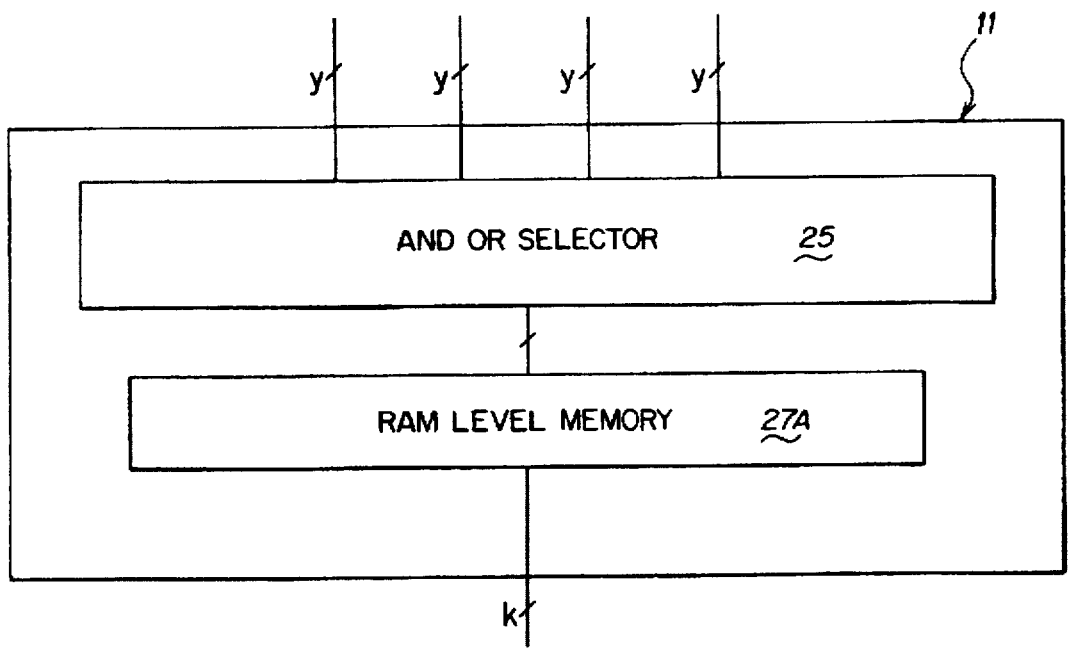
FIG. 9 is a schematic view of a control unit incorporated to the central unit of FIG. 4.

In the example considered herein, the memories 7 have been selected to have a word length p of thirty two bits, and each memory has thirty two bus outputs h connected directly to respective inputs of an interfacing circuit 9 which has its output coupled, over a bus y, to an inference control unit 11 to be described with specific reference to FIG. 9. This unit 11 has k outputs connected to a memory 13 which has, in turn, bus outputs a, b which are also the outputs of the fuzzy controller core 5. Memory 13 contains those membership function-related data that appear in the THEN part of the inference rules.

It is to be appreciated, therefore, that the stored data are split in a discrete fashion according to whether they relate to the membership functions appearing in the IF or THEN parts of the fuzzy rules.

Advantageously, in accordance with the invention, the memories 7 are set up internally in a particular way to contain the IF-part membership functions $\mu(x)$ of the fuzzy X variables to be handled by the controller 1 during the fuzzy logic conversion step.

With the adoption of a vectorial representation wherein N=64 and L=16, each membership function occupies 256 memory bits.

In order to maximize the parallelism level P of the machine, the global memory is divided into four structurally independent memories 7, each comprising a series U of thirty two bits, where the U value takes into account the amount of membership functions $\mu(x)$ present in the aforesaid term set and reflects the number of the address buses of the storage modules.

The overall width of the storage modules is equal to the internal parallelism value P of the machine. The higher the value of P, the greater is the number of elements of the universe of discourse that can be computed in parallel. For the instant architecture, a value of P=128 bits is preferred, which enables parallel operations to be carried out on thirty two elements of the universe of discourse.

By having the memory divided into four separate modules 7, the values of the membership functions related to four fuzzy X variables associated with the control inputs can be accessed at one time. The number of the modules is, therefore, a function of the number of external variables with which one can interact.

Figure 5:
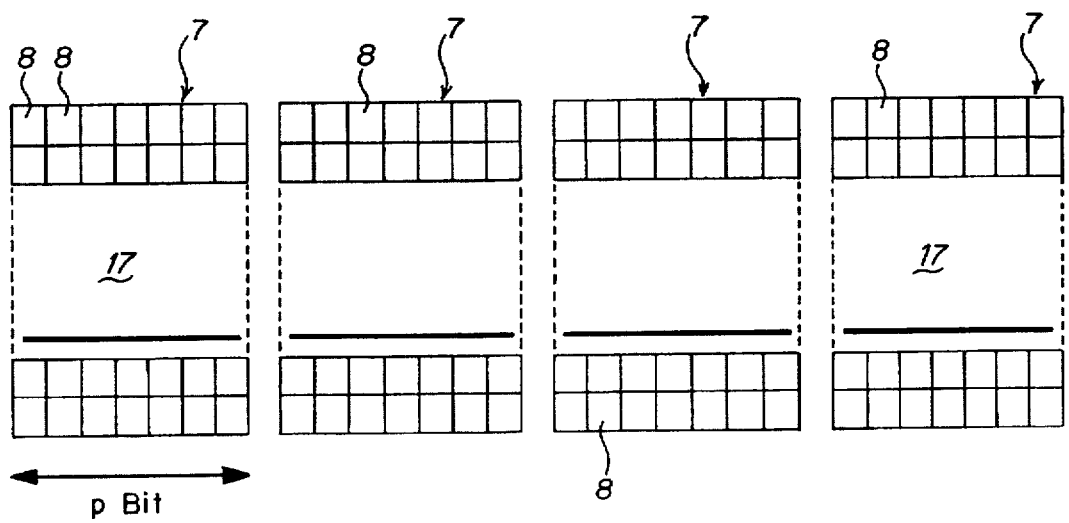
FIG. 5 is a diagramatic view of some storage modules incorporated into the architecture depicted in FIG. 1.

With reference to FIG. 5, it can be seen that each storage module 7 has an addressing area 17 wherein the membership functions of only the IF parts alone of the fuzzy inference rules are stored.

Figure 6:
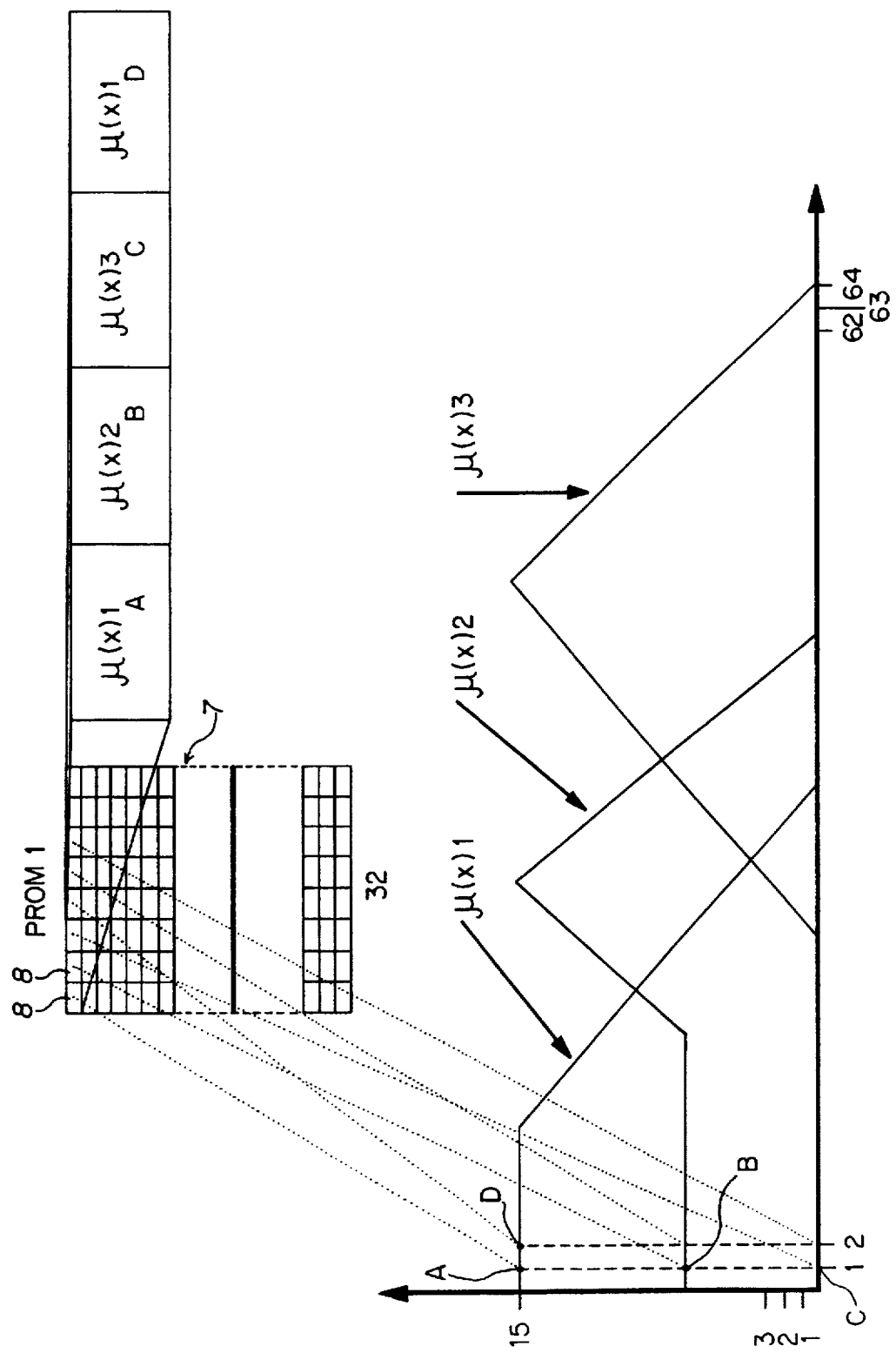
FIG. 6 illustrates diagramatically the data setup in the memories of FIG. 5.

In the interest of a clearer appreciation of the kind of memory setup in accordance with the invention, a simple example will be suitably given now with reference to FIG. 6.

Considering a simple term set including three membership functions $\mu(x)$, with a conventional method the information would be stored in by sequentially writing the level of truth for each point of each membership function. The functions would be allocated in contiguous locations.

The method of setting up the memory according to the invention instead operates in a very different way.

The elements of one term set carrying the same i subscript representing the i-th horizontal segment in the $|1, \ldots, N|$ universe of discourse, are stored consecutively in the cells 8. The situation is illustrated by a graph in FIG. 6 showing plottings of three membership functions $\mu(x)1, \mu(x)2, \mu(x)3$, and the values of A, B, C and D of these functions at the first and second points of the universe of discourse.

With this memory setup, when the value of a fuzzy variable is identified, all the values of $\alpha$ related to that variable can be accessed through a limited number of accesses to memory 7 which is a function of the number F of membership functions $\mu(x)$ in the term set involved as well as of the size of the memory word (in this case thirty two bits).

In essence, the number of the accesses is given by an excess value of F/8, where 8 represents the largest number of $\alpha$ values that can be stored with a word of thirty two bits.

Further, with this memory setup, all the values of $\alpha$ related to a variable occupy consecutive locations in the memory, and it will be sufficient to increment the address of cells 8 stepwise to successively read the values of $\alpha$ for any given variable.

Let us consider now the method of storing membership functions pertaining to the THEN part of the rules. The data are stored in a different way from the previous case, both on account of the different nature of such data and to promote efficient processing thereof.

Whereas in the previous case accessing the $\alpha$ values of each variable at one time was important, what matters in this case is that the defuzzyfier 15 must be supplied with data on which to carry out subsequent fuzzy rule computations in an efficient manner.

Figure 7:
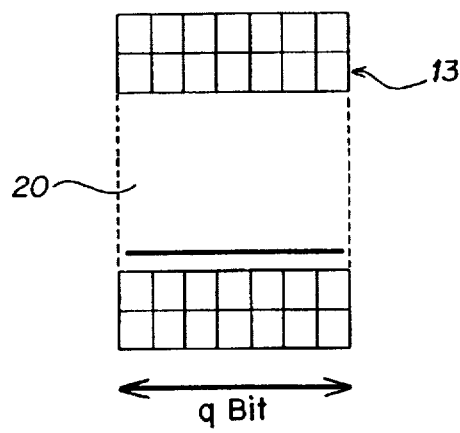
FIG. 7 is a diagramatic view of a further storage module incorporated into the architecture in FIG. 1.

For this purpose, the memory block 13, shown in FIG. 7, is provided with an address area 20 containing those data of the membership functions which relate to the THEN-part variables of the rules.

As explained further in this description, in order to carry out defuzzyfying operations on the membership functions for the THEN part, little but meaningful information need to be available, namely:

the center of gravity Cg for each membership function, and a weight associated with each $\Theta$ value of that membership function.

Advantageously, the center of gravity can be found from the ratio of two summations executed in parallel and respectively involving the numerator and denominator terms of the ratio.

Stored in each memory word of block 13 are both the numerator and denominator terms, which are associated with the same value of $\Theta$. Thus, both data can be read with a single memory access.

More particularly, a memory word of the block 13 has a number q of bits given by the sum of those used to represent the addend in the numerator plus that in the denominator of the above ratio.

In general, the number of bits needed to represent these terms will be a function of the horizontal resolution N (universe of discourse) and vertical resolution L (levels of truth).

Assuming that the MAX-MIN inference method is used for the THEN part of the rules, the addend in the numerator would be found from: $Ai*Xgi$; while the corresponding addend in the denominator would be just $Ai$; where $Ai$ is the area of a given output membership function and $Xgi$ is the center of gravity of that function.

Assuming instead that the MAX-DOT method is used instead, the addend in the numerator would be:

θi*Ai*Xgi; and that in the denominator: θi*Ai;
where θi denotes the weight applied to the i-th membership function, in the THEN part affected by the summations.

Using the vertical and horizontal resolution values of L and N suggested above, it is found that:

(a) the number Ni of bits for the numerator term is =2*L+2*N (b) the number Di of bits for the denominator term is =2*L+N (c) the number q of bits per memory word is =(a)+(b)= =4*L+3*N and assuming a resolution of ten bits for a universe of discourse N=1024, and four bits with L=16 degrees of truth, the following dimensions are found by substitution into (a), (b), and (c) above: (a)=28 bits; (b)=18 bits; (c)=46 bits=q.

These values define the size of the data buses, a and b, which connect the outputs of memory 13 to the corresponding inputs of the defuzzyfier 15.

The dimensions that the memory block 13 should have in order for it to contain all of the data needed will now be described.

Since a weight value θ is associated with each of the terms of the previously mentioned summations, all the data to be processed can be obtained by storing, for each membership function, L terms for the numerator and terms for the denominator.

This estimate may be modified by the presence of associated data with a value of θ=0 that are of no use to the computation operations. In fact, those terms which are associated whit zero values of θ would be detected by circuitry coupled to the controller for generating control signals, and are not even sent to storage.

Figure 15:
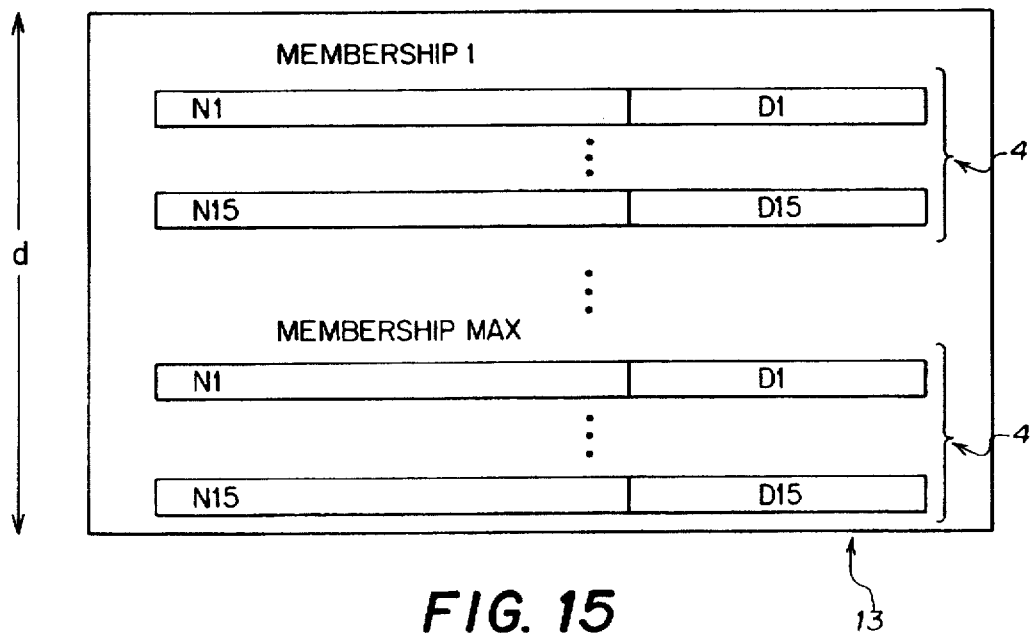
FIG. 15 is a more detailed view schematically showing the internal structure of the storage module in FIG. 7.

As shown in FIG. 15, the memory 13 is divided ideally into contiguous areas 4, each containing the data of a particular membership function.

If the initial address of the storage area occupied by the k-th membership function, THEN part, is denoted by IND-k, then the data related to the i-th value of θ will be stored at a location IND-k+i.

In this way, the memory address can be generated by simply adding an offset amount to the value of θ which identifies the upper boundary of the storage area occupied by the membership function determined by the center of gravity calculation.

Lastly, in view of the fact that L-1 different words of the type described above will be needed for each membership function, and that a fuzzy set is associated with each output variable, the overall size of memory 13 can be obtained:(d) Number of Memory Words=(L-1)*(Number of Membership Functions per Fuzzy Set)*(Number of Output Variables).

Accordingly, setting the number of variables equal to six and the number of fuzzy sets equal to twelve per term set, a global memory size of 51840 bits is obtained. This memory could be expanded with modules external to the controller 1 to boost its capacity.

Figure 8:
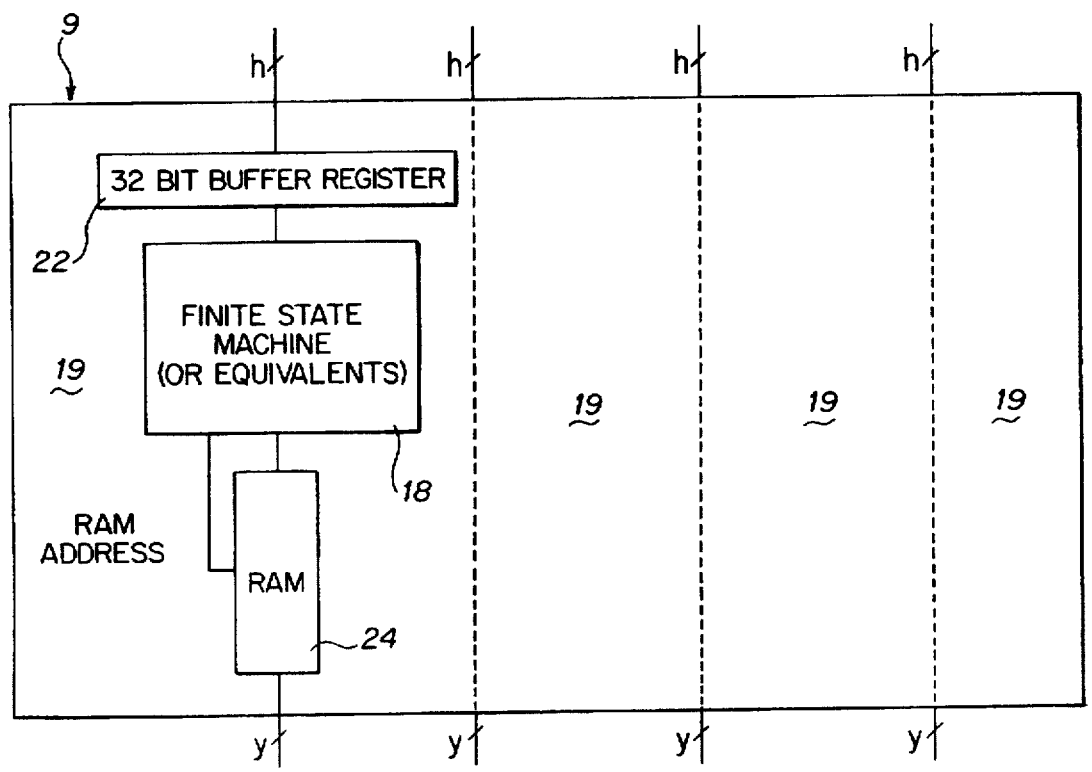
FIG. 8 shows schematically a computation circuit incorporated to the central unit of FIG. 4.

With reference to FIG. 8, the internal structure of the interfacing circuit 9 will be now described in detail, which circuit is to handle and convey information from the memories 7 for the fuzzy controller inference unit 11. Interfacing circuit a is used because the information from the read-only memories 7 cannot be passed directly to the computational elements due to the dynamic memory allocation.

The circuit 9 is divided into blocks 19, which are identical with one another and equal in number to the number of memories 7. Since the memory word related to the IF part of the rules can contain no less than 1 and no more than 8 values of α related to the same fuzzy variable X, such values of a will be conveniently processed through a buffer register 22 connected to the corresponding memory 7 by bus h, as well as through a read and write memory 24 of the RAM type, to be accessed via a finite state machine 18 connected to the output of register 22.

Figure 10:
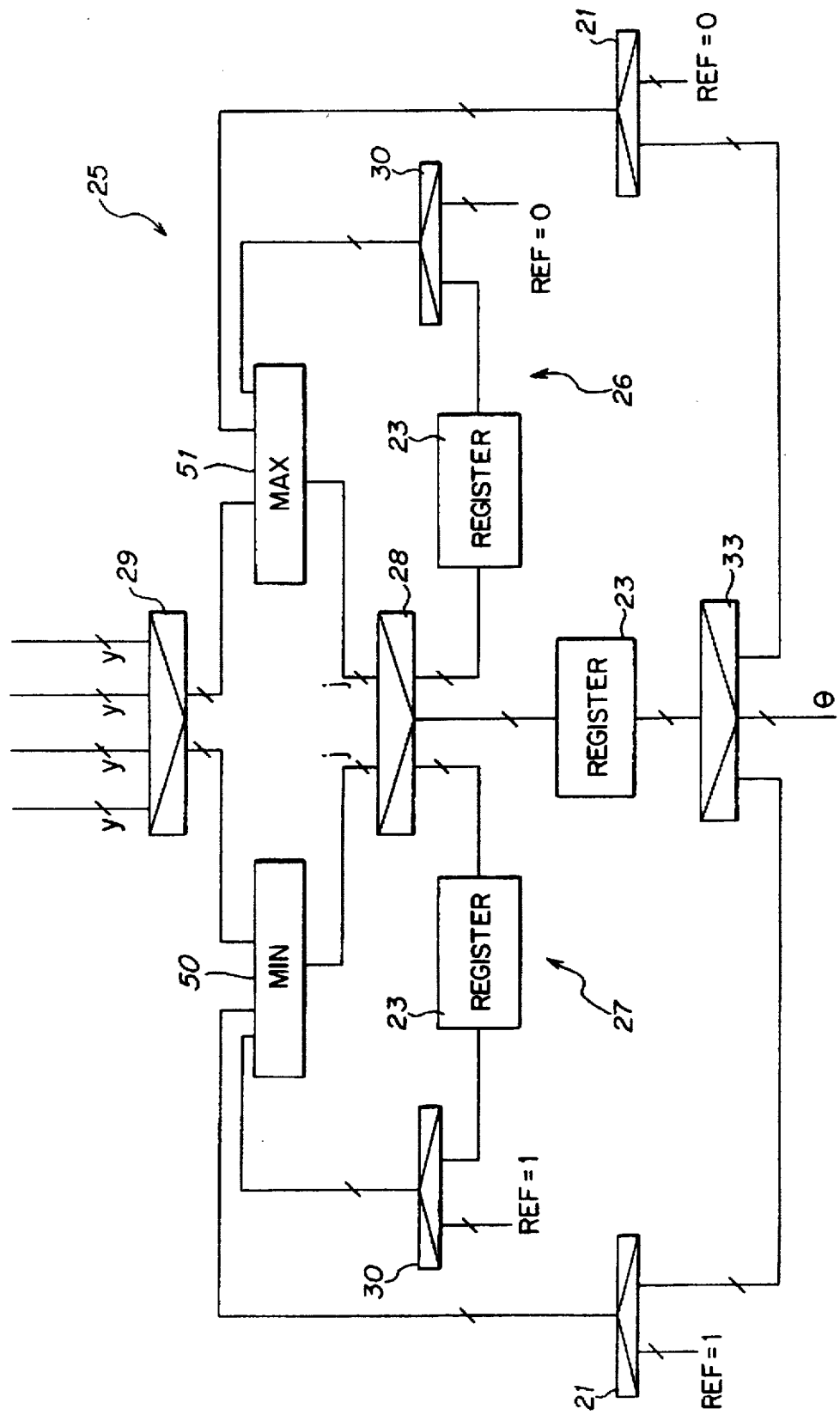
FIG. 10 shows in schematic form a detail of the control unit in FIG. 9.

The RAM size is dependent on the maximum number of membership functions present in the term set, twelve in this case. A four-bit bus y comples the output of RAM 24 to the input of an AND-OR selector 25 incorporated into the fuzzy controller inference unit 11, as shown in FIGS. 4, 9 and 10.

Unit 11 represents the core of the controller 1, and the value of θ for each fuzzy rule is computed within said unit.

The AND-OR selector 25 (FIG. 9) is arranged to compute the value of θ for a given inference rule based on known values of αi associated with a function μ(x). In detail, the architecture of selector 25 is as shown in FIG. 10 and comprises two symmetrical portions 26, 27 respectively intended for computing prepositions with logic OR and AND operands.

Selector 25 receives at its input via the bus y from the memories 24 the values of α for a given rule, and can handle rules having an arbitrarily long number of prepositions (IF part). Depending upon the types of the logic operands contained in a rule, the values of α are forwarded by a multiplexer 29 either into the MIN or the MAX block.

Figure 11:
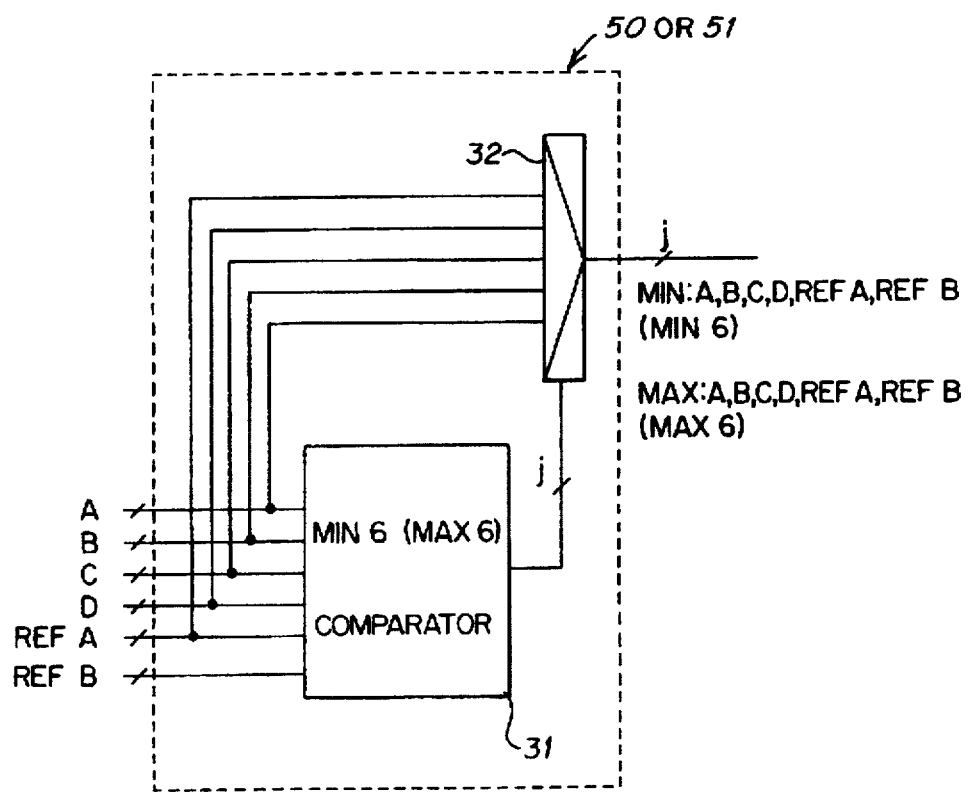
FIG. 11 is a schematic detail of the MIN or MAX blocks illustrated in FIG. 10.

The structure of a single MIN or MAX 51 block is depicted in FIG. 11 and includes a comparator 31 having a plurality of inputs which receive the values of α from memories 24 and a single bus output j on which either the minimum or maximum of the input values is presented. The comparator 31 output is sent to a mixer 32 to which the signals applied to the comparator input are also sent following appropriate routing.

The great simplicity of this computational approach is attributable to the fact that only simple comparison operations are carried out between quantities. This affords considerable savings in computing time as well as in electronic components.

Within the selector 25, the provision of some buffer registers 23 makes a local memory available for carrying out feedback computing operations based on the partial results of the previous operations.

Each of portions 26 and 27 comprises a feedback loop wherein the output from each MIN or MAX block is re-applied to the block input using a multiplexer 28, a register 23, and a second multiplexer 30.

A second feedback loop, which may be viewed as external of the former, takes the multiplexer 28 output back to an input both of the MIN block and the MAX block through a register 23 and two cascaded multiplexers 33 and 21.

By providing two feedback loops for each of the MIN and MAX functional blocks, the weight O of a rule can be computed even if it happens to be a complex one, using a strategy that minimizes the processing time.

The sequence for the operations and the nature of the weights α are defined within the machine control micro, and become known once the compilation of the fuzzy rules that represent the control program is completed.

The various multiplexers provided in the selector 25 are operated by the same control signals, and effective to supply either meaningful or unimportant data, according to whether the operation to be carried out requests the data stored in the registers.

The selector output, and particularly the output from multiplexer 33, carries the value of θ associated with a membership function, as found from a suitable combination of several weight a functions in a predetermined sequence order.

This value of θ is representative of the level of truth associated with a given membership function, IF part, and is stored into the memory 27A connected to the output of selector 25. Contained in that memory 27 are all the values of θ obtained from computing the IF parts of all the rules, which are used to modify the membership functions in the THEN part of the rules during the second step of the inference process described herein below.

Figure 12:
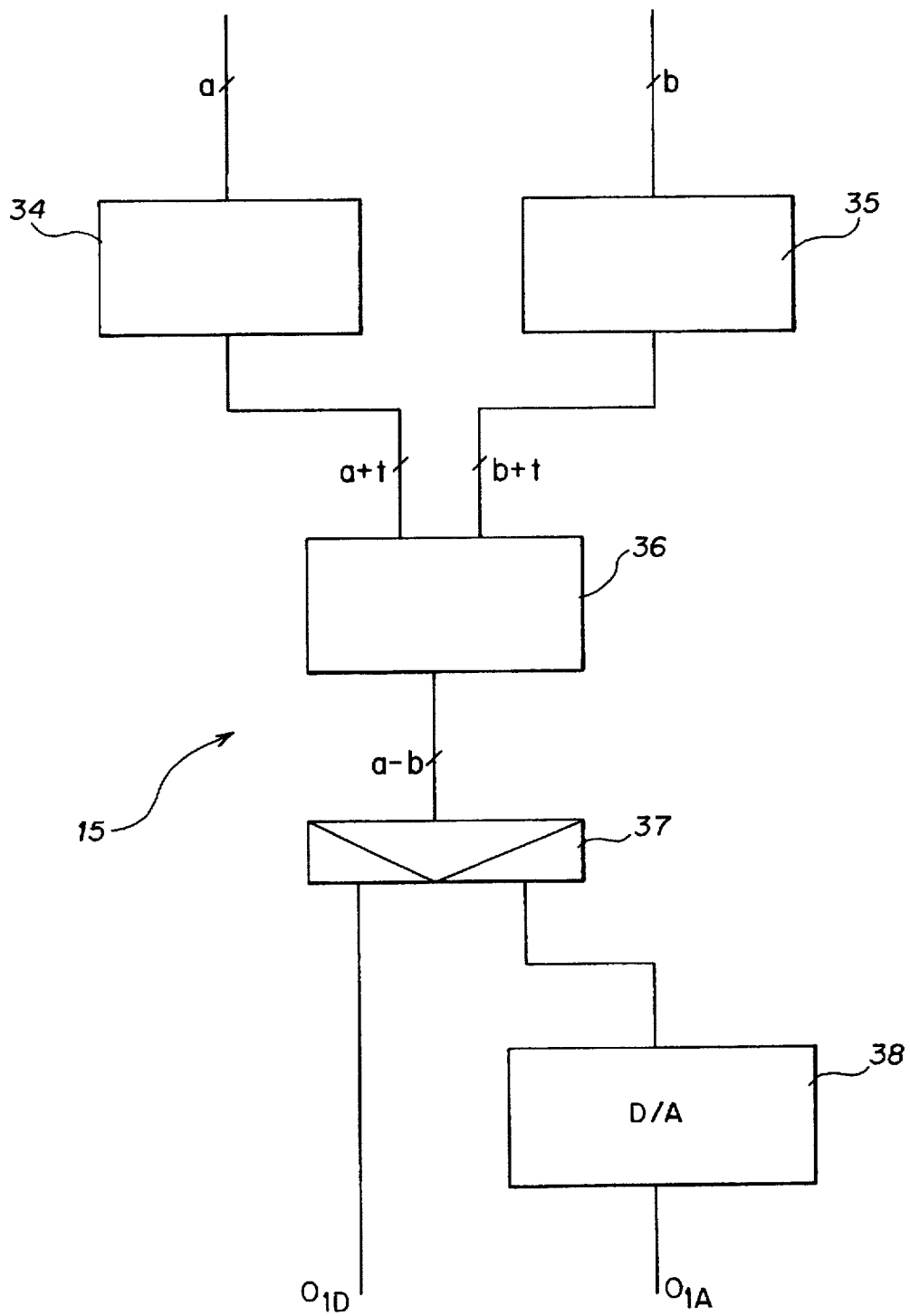
FIG. 12 is a schematic detail of the defuzzyfier in FIG. 1.

The foregoing description of the inner structure of controller 1 will be now completed with reference to FIG. 12, which illustrates in schematic form the defuzzyfier 15. Within the defuzzyfier 15, the membership functions are united in accordance with the computational model of the fuzzy logic, to output the control signals following an appropriate conversion.

It therefore becomes necessary to transform the membership functions into discrete representations within their pertinent universe of discourse. For this purpose, a variety of algorithms is often used, of which the so-called center-of-gravity algorithm is the most frequently adopted one.

With this method, the controller 1 output is given basically by the center of gravity associated with a function resulting from the fuzzy rules processing. However, in order to get this result, the algorithm should carry out a large number of computations, because the summations that appear in the center of gravity computing formula depend on the horizontal resolution adopted to digitize the universe of discourse.

Thus, the implementation of the subject algorithm requires a high level of parallelism at the computation stage to provide a sufficient execution rate. Of course, a reduction of the computational load during this operative stage of fuzzy logic processing is of vital importance if acceptable performance is to be provided by the controller.

Within the scope of this invention is, therefore, the use of a different defuzzyfying algorithm which can greatly reduce the computing time and enable the user to modify the membership functions, THEN part, to suit the weights of the inference rules, irrespective of whether the MAX-MIN or MAX-DOT method is used to find such membership functions.

The resulting function from the fuzzy computation is obtained by carrying out a sum of the individual, THEN part, membership functions as modified according to the weight O of the inference rule wherein they appear.

Consequently, the center of gravity of the resulting function from the fuzzy computation can also be found from the centers of gravity associated with the individual membership functions which have generated it.

These partial centers of gravity are called "centroids", and the computation method just discussed is called the centroid method.

Figure 13:
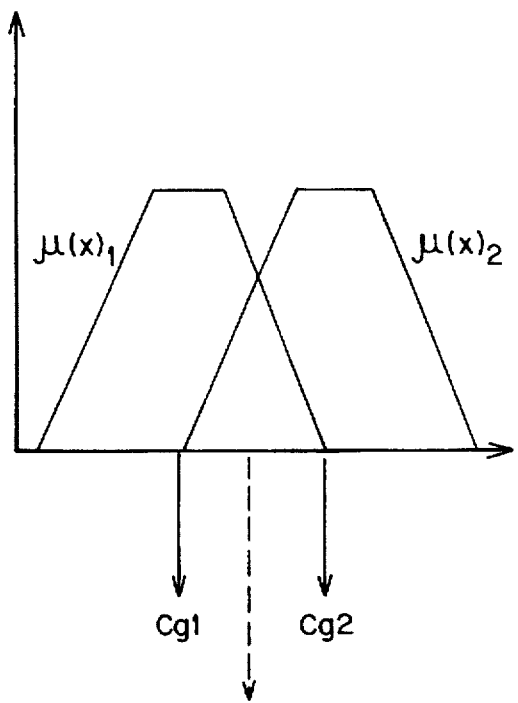
FIGS. 13 and 14 show respective graphics representing logic operations performed, according to fuzzy logic, using the inventive controller.
Figure 14:
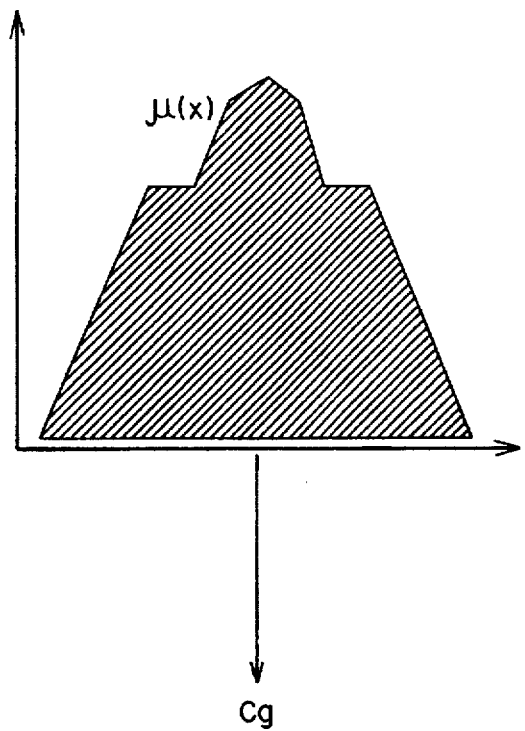

Plotted visually on the graph of FIGS. 13 are two membership functions μ1(x) and μ2(x) with respective centroids Cg1 and Cg2. FIG. 14 is a graph illustrating a function μ(x)=μ1(x)+μ2(x) with the center of gravity Cg calculated from the previous centroids.

By generalizing this process, the equations for calculating the center of gravity Cg can be defined dependent on whether the MIN-MAX or MAX-DOT inference method is used to find the membership functions, THEN part, concerning a given value of θ.

With the Max-Min method: $Cg = \Sigma i Ai * X_{gi} / \Sigma i Ai$
where i varies between 1 and n, and where: Ai is the area of a given output membership function; $X_{gi}$ is the center of gravity of said function; and n is the number of functions, THEN part, involved in the summation.

With the Max-Dot method, on the other hand:
$Cg = \Sigma i \Theta i Ai * X_{gi} / \Sigma i Ai$ where i varies between 1 and n and Θi is found from the weights associated with the various membership functions, THEN part, related to the output in question.

Since the above equations are formally identical, they can be reduced to a more general expression:

$Cg = \Sigma i Numi / \Sigma i Deni$ where i varies between 1 and n, and where Num and Den generally indicate the terms which appear in the numerator and the denominator of the formulae.

It can be appreciated at once, however, that all these summations can be extended to the number of fuzzy sets involved in the center of gravity computation. This number is much smaller than the number of points which make up the discrete universe of discourse.

In addition, not all of the fuzzy sets in the term set would enter the computation, but only those which contribute to the summation, that is those associated with a weight θ other than zero.

In summary, the calculation algorithm proposed herein affords a significant reduction in the number of the operations required to find the center of gravity, and FIG. 12 shows one example of an architecture of the block 15 which implements the algorithm.

Indicated at 34 and 35 in FIG. 12 are two adder blocks, with the former being intended for computing the summation of the terms in the numerator, and the latter for computing the summation of the denominator terms.

Block 34 is input data via bus "a" from memory 13, and outputs to "a+t" buses coupled to a divider 36. The t increment of the number of output bits is available for the user to select the maximum number of fuzzy sets in a term set.

Likewise, block 35 is input data over bus "b" from memory 13, and has "b+t" outputs coupled to the input side of the divider 36 that divides the two summations to obtain the center of gravity Cg.

The output side of divider 36 has a number of bits equal to the difference (a−b) of the number of bits in the numerator minus that in the denominator of the summation.

After the divider 36, a multiplexer 37 conveys the signal to a digital/analog converter 38 to provide an analog signal for the output O1A.

The defuzzyfier 15 thus provides an interface between the controller 1 and the outside circuitry, since it would be impossible to drive an actuator directly through fuzzy logic information, because the actuator would be unable to interpret such information.

The controller architecture according to the invention solves the technical problem and distinguishes itself from known solutions by its ability to simplify much of the computational work involved in inference operations. More specifically, a major innovative aspect of the controller according to this invention is that, in the memories incorporated thereto, the membership functions of the IF and THEN parts of the inference rules are differently contained and represented. In addition, the unique setup of the memories removes restrictions on the form that the membership functions can take.

Having thus described one particular embodiment of the invention, various alterations, modifications, and improvements will readily occur to those skilled in the art. Such alterarions, modifications, and improvements as are made obvious by this disclosure are intended to be part of this disclosure though not expressly stated herein, and are intended to be within the spirit and scope of the invention.

Accordingly, the foregoing description is by way of example only and is not intended as limiting. The invention is limited only as defined in the following claims and the equivalents thereto.

What is claimed is:

1. A method of operating memories of a fuzzy logic electronic controller, comprising the steps of:

performing inference operations on membership functions of logic variables, said inference operations configured as IF-THEN rules, each rule including at least one front preposition and at least one rear implication;

storing membership functions of each logic variable of the front preposition of each rule in a respective storage module; and storing membership functions of the rear implication of each rule in a single storage module, wherein the membership functions of the rear implication are stored as a plurality of memory words, each memory word including two discrete terms for calculating a center of gravity.

2. The method of claim 1, further comprising the step of storing discrete values of the membership functions corresponding to a value of a logic variable at consecutive locations in the respective storage module.

3. The method of claim 1, further comprising the step of calculating the center of gravity according to the formula $$C_g = \Sigma_i Num_i / \Sigma_i Den_i$$

where i varies between 1 and n

Num=numbers which appear in the numerators of a Max-Min or Max-Dot method

Den=numbers which appear in the denominator of a Max-Min or Min-Dot method.

4. The method of claim 1, wherein said discrete terms of said memory word include the numerators and denominators of a Max-Min or Max-Dot method.

5. A method of operating memories of a fuzzy logic electronic controller, comprising the steps of:

performing inference operations on membership functions of logic variables, said inference operations configured as IF-THEN rules, each rule including at least one front preposition and at least one rear implication;

storing membership functions of each logic variable of the front preposition of each rule in a respective storage module; and storing membership functions of the rear implication of each rule in a single storage module.

6. The method of claim 5, further comprising the step of storing discrete values of the membership functions corresponding to a value of a logic variable at consecutive locations in the respective storage modules.

* * * * *

UNITED STATES PATENT AND TRADEMARK OFFICE
CERTIFICATE OF CORRECTION

PATENT NO. : 5,799,132

DATED : August 25, 1998

INVENTOR(S): Gianguido RIZZOTTO, Rinaldo POLUZZI and Andrea PAGNI

It is certified that error appears in the above-identified patent and that said Letters Patent is hereby corrected as shown below:

Col. 10, line 28, should read

The structure of a single MIN 50 or MAX 51 block is

Signed and Sealed this

Eighth Day of December, 1998

*Attest:*

BRUCE LEHMAN

*Attesting Officer*  *Commissioner of Patents and Trademarks*